L. J. CRAWFORD.
VEHICLE WHEEL.
APPLICATION FILED MAY 3, 1907.

903,681.

Patented Nov. 10, 1908.

Inventor
Leroy J. Crawford

Witnesses
R. C. Claflin
C. Bradway.

By Victor J. Evans
Attorney

UNITED STATES PATENT OFFICE.

LEROY J. CRAWFORD, OF JUNIATA, NEBRASKA.

VEHICLE-WHEEL.

No. 903,681.  Specification of Letters Patent.  Patented Nov. 10, 1908.

Application filed May 3, 1907. Serial No. 371,696.

*To all whom it may concern:*

Be it known that I, LEROY J. CRAWFORD, a citizen of the United States, residing at Juniata, in the county of Adams and State of Nebraska, have invented new and useful Improvements in Vehicle-Wheels, of which the following is a specification.

This invention relates to a vehicle wheel especially intended for automobiles, bicycles and the like and relates more particularly to a wheel of that type having an outer casing or section that is cushioned with respect to an inner section so that shocks and vibrations due to obstructions in the roadway are not transmitted to the vehicle, thus insuring easy running.

The invention has for one of its objects to improve and simplify the construction and operation of devices of this character so as to be comparatively easy and inexpensive to manufacture, thoroughly reliable and efficient in use and of substantial and durable design.

A further object of the invention is the provision of a wheel composed of an inner and outer section with cushioning devices between them, each device comprising a spring attached to the inner section and internal spokes extending inwardly from the extremities of the spring and pivoted at their inner ends on the outer section, thereby permitting free relative movement of the sections.

A still further object is to provide a wheel having an outer section in the form of a hollow disk shaped casing that serves as a housing for the inner section and cushioning devices and whose periphery constitutes the tread of the wheel.

With these objects in view and others as will appear as the description proceeds, the invention comprises the various novel features of construction and arrangement of parts which will be more fully described hereinafter and set forth with particularity in the claims appended hereto.

Figure 1:
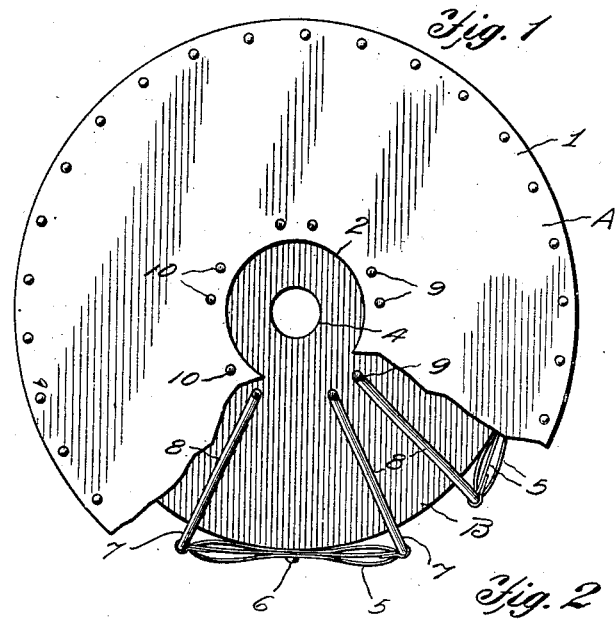
Figure 4:
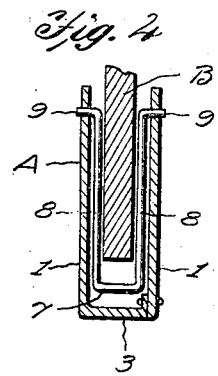
Figure 3:
Figure 2:
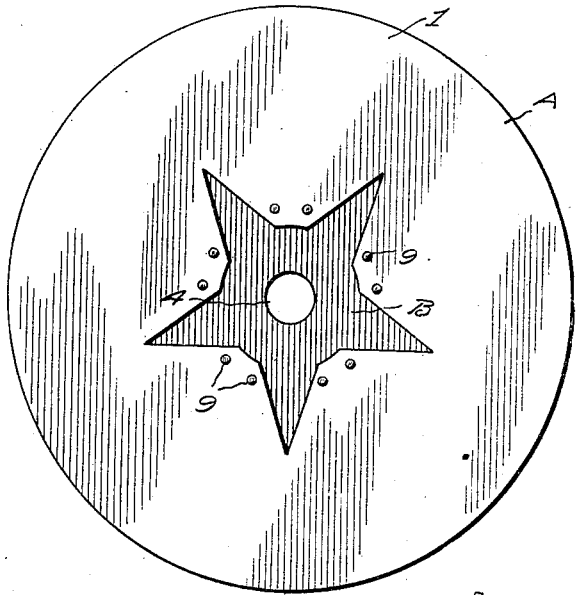

In the accompanying drawings which illustrate one of the embodiments of the invention, Figure 1 is a side elevation of the wheel, partly broken away to show the cushioning devices. Fig. 2 is an elevation showing an opposite side of the wheel. Fig. 3 is a top view of the wheel. Fig. 4 is a detail section taken radially through a portion of the wheel.

Similar reference characters are employed to designate corresponding parts throughout the several views.

Referring to the drawing, A designates the outer section and B the inner section of the wheel, the sections being constructed of any suitable material and by preference, the outer section comprises a metal shell in the form of a hollow disk, the sides 1 thereof having central openings 2 for the reception of the axle. The sides 1 are connected with the periphery 3 in any suitable manner. The inner section as shown, in the present instance, is a disk B which may be made of metal and provided with an opening 4 for receiving an axle to which the disk will be keyed or otherwise secured. The inner section B is of considerable less diameter than the outer section, so that relative movement will be permitted and also the openings 2 are of ample diameter to permit relative movement between the outer section and the axle on which the wheel is mounted. Arranged within the outer section, which is in the form of a housing or casing, are cushioning devices each of which comprises a plurality of leaf springs 5. The central leaf is straight and those at opposite sides thereof are bowed outwardly at their ends with the extremities bearing on the central leaf and the leaves are arranged side by side and secured at their centers to the disk B by a pin, bolt or the like 6, whereby the springs are disposed in tangential relation on the periphery of the inner section and hinged to the ends of the central leaf are U-shaped spokes or links 7 whose arms 8 extend between the inner and outer sections, as shown clearly in Fig. 4. The inner ends of the arms 8 are bent laterally into pivots 9 that enter openings 10 in the side walls 1 of the outer section. The springs are free to flex inwardly or outwardly according to the disposition of the weight and as the wheel revolves the springs are constantly moving in and out as the weight is transferred from point to point. The links, since they are hingedly connected with the springs and with the outer section of the wheel, readily permit of relative movement of the two sections of the wheel.

From the foregoing description taken in connection with the accompanying drawing, the advantages of the construction and of the method of operation will be readily apparent to those skilled in the art to which the invention appertains, and while I have described the principles of operation of the invention together with the device which I now consider to be the best embodiment thereof, I desire to have it understood that the device shown is merely illustrative and that such changes may be made when desired as are within the scope of the claims.

Having thus described the invention, what is claimed as new is:—

1. A wheel comprising inner and outer sections, the outer section consisting of a rim or tread, and side plates secured thereto to form a housing for the inner section, the side plates being provided with axle-receiving openings and apertures disposed around the openings, cushioning devices arranged between the sections and housed in the outer section, and links connected with the cushioning devices and having their inner extremities formed into pintles for engaging in the apertures of the side plates.

2. A wheel of the class described comprising an inner and an outer section, and a plurality of cushioning devices between them, each device composed of an elastic element arranged in tangential relation to one of the sections, and U-shaped links straddling the inner section hingedly connected to the ends of the element and having their ends bent outwardly to connect with the outer section.

3. A wheel of the class described comprising relatively movable inner and outer sections, and cushioning devices between the sections, each device comprising springs connected with one of the sections, and U-shaped links connected at their middle portions with the springs and extending inwardly therefrom and hingedly connected at their ends with the outer sections.

In testimony whereof, I affix my signature in presence of two witnesses.

LEROY J. CRAWFORD.

Witnesses:
CHAS. K. HART,
EARL H. GROUND.